(12) United States Patent
Heo

(10) Patent No.: US 8,478,119 B2
(45) Date of Patent: Jul. 2, 2013

(54) LENS MOVEMENT CONTROL METHOD AND LENS MOVEMENT CONTROL APPARATUS OF CAMERA MODULE

(75) Inventor: Joon Heo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 13/246,194

(22) Filed: Sep. 27, 2011

(65) Prior Publication Data

US 2012/0076481 A1 Mar. 29, 2012

(30) Foreign Application Priority Data

Sep. 28, 2010 (KR) .................. 10-2010-0093625

(51) Int. Cl.
*G03B 13/36* (2006.01)
(52) U.S. Cl.
USPC .......................... 396/129; 396/133

(58) Field of Classification Search
USPC .................................. 396/129, 133
See application file for complete search history.

(56) References Cited

U.S. PATENT DOCUMENTS

| 8,189,280 B2* | 5/2012 | Ollila et al. ............... 359/824 |
| 8,260,130 B2* | 9/2012 | Wang ............... 396/133 |
| 2012/0076481 A1* | 3/2012 | Heo ............... 396/90 |

* cited by examiner

*Primary Examiner* — W B Perkey
(74) *Attorney, Agent, or Firm* — Jefferson IP Law, LLP

(57) ABSTRACT

A lens movement control method and a lens movement control apparatus of a camera module for preventing allophone of a Voice Coil Actuator (VCA) are provided. The lens movement control method of a camera module includes switching the camera module from a camera operation mode to a camera stop mode, generating a control signal for removing the occurrence of VCA allophone in the camera stop mode, moving a lens to a VCA allophone removal location based on the generated control signal, and powering-off the camera module to move the lens moved to the VCA allophone removal location to a bottom surface of the lens.

8 Claims, 5 Drawing Sheets

LENS MOVEMENT CONTROL METHOD AND LENS MOVEMENT CONTROL APPARATUS OF CAMERA MODULE

PRIORITY

This application claims the benefit under 35 U.S.C. §119 (a) of a Korean patent application filed on Sep. 28, 2010 in the Korean Intellectual Property Office and assigned Serial No. 10-2010-0093625, the entire disclosure of which is hereby incorporated by reference.

BACKGROUND OF THE INVENTION

1. Field of the Invention

The present invention relates to a lens movement control method and a lens movement control apparatus of a camera module. More particularly, the present invention relates to a lens movement control method and a lens movement control apparatus of a camera module for preventing allophone of a Voice Coil Actuator (VCA).

2. Description of the Related Art

In cases where a camera module photographing a moving image or taking a picture is mounted in a portable terminal, a Voice Coil Actuator (VCA) has been widely used as the means to make a lens perform a linear motion for focusing.

FIG. 1 is a cross-sectional view illustrating a state of a VCA in a camera module when it is in an operation mode according to the related art. FIG. 2 is a cross-sectional view illustrating a state of a VCA in a camera module after a lens moves to a bottom surface according to the related art.

Referring to FIGS. 1 and 2, a VCA 120 engages with a side surface of a lens 110 to be located at an upper portion of a bobbin support 131 of a housing 130. The VCA 120 includes a permanent magnet 122 and a bobbin 121. When a camera module 100 is switched from a camera operation mode to a camera stop mode, power of the camera module 100 is turned-off. Accordingly, as shown in FIG. 2, the bobbin 121 moves the lens 110 to a bottom surface 133 by force of a spring 160. As illustrated above, when the lens 110 moves to the bottom surface 133, a VCA allophone is created when a lower end of the bobbin 121 collides with a bobbin support 131 of the housing 130.

A lens movement control operation of a camera module according to the related art will be described below with reference to a control block diagram of FIG. 3, and a lens movement control flowchart of FIG. 4.

FIG. 3 is a block diagram illustrating a camera module with a VCA according to the related art, and FIG. 4 is a flowchart illustrating a lens movement control method of a camera module for preventing an occurrence of a VCA allophone according to the related art.

Referring to FIGS. 3 and 4, a controller 103 determines whether a camera module is in a camera operation mode based on an input from an input unit 102 in step S11. If it is determined in step S11 that the camera module is not in the camera operation mode, the controller 103 returns to step S11. In contrast, if it is determined in step S11 that the camera module is in the camera operation mode, the controller 103 enters a camera stop mode in step S12.

The camera operation mode is a mode in which the camera module is performing a photographing operation. The camera operation mode includes a preview (i.e., a state displaying that a camera module is performing a photographing operation before taking a picture) or a photographing of a moving image. Furthermore, the camera stop mode is a mode in which the camera module stops a photographing operation. The camera stop mode includes a quick view (i.e., a state displaying a taken picture on a screen for a moment directly after taking a picture in a preview state), a menu view or a photograph view. Entering the camera stop mode may automatically be performed by a controller 103 like the quick view and may be performed as a result of an input into an input unit 102.

In step S13, the controller 130 sets a number (n) (the time it takes for a bobbin to drop, in seconds) of bobbin 121 drops to an initial value 0 and controls a lens driving unit 104 to drop a bobbin 121 in step S14. When the bobbin 121 starts to drop, the controller 103 increases the number (n) of bobbin 121 drops by 1 in step S15. Next, the controller 103 determines whether a lens 110 moves to a bottom surface 133 by using a detecting unit 105 in step S16. If it is determined in step S16 that the detecting unit 105 detects that the lens 110 moves to the bottom surface 133, the controller 103 controls a lens driving unit 104 to terminate lens movement. In contrast, if it is determined in step S16 that the lens 110 does not move to the bottom surface 133, the controller determines whether the number (n) of bobbin 121 drops is equal to 6 (a maximum number of time a bobbin may drop before power off of a camera module) in step S17. Although the maximum number of bobbin 121 drops is equal to 6 in this example, it is possible for it to be more than 7. If it is determined in step S17 that the bobbin dropping number is less than 6, the controller 103 returns to step S14 and repeats the process of dropping the bobbin 121. Accordingly, it is appreciated in the related art that the lens 110 slowly moves to the bottom surface 133. In contrast, if it is determined in step S17 that the number of bobbin 121 drops is not less than 6, the controller 103 turns-off camera power in step S18 and terminates the lens movement control operation.

As illustrated above, in the lens movement control method of the related art, after the bobbin 121 has dropped, the lens moves to the bottom surface. The foregoing procedure is repeated by the maximum number of bobbin 121 drops. This repetition procedure increases the operation time. As a result, it takes more than 6 seconds from when a camera enters a stop mode to a when the lens of the camera module moves to the bottom surface, which results in an error frequently occurring in the determining procedure.

Therefore, a need exists for a lens movement control method of a camera module having a short operation time capable of preventing the occurrence of an error and a VCA allophone, and an apparatus thereof.

SUMMARY OF THE INVENTION

Aspects of the present invention are to address the above problems and/or disadvantages and to provide at least the advantages described below. Accordingly, an aspect of the present invention is to provide a lens movement control method of a camera module having a short operation time capable of preventing the occurrence of an error and a Voice Coil Actuator (VCA) allophone, and an apparatus thereof.

In accordance with an aspect of the present invention, a lens movement control method of a camera module is provided. The lens movement control method includes switching the camera module from a camera operation mode to a camera stop mode, generating a control signal for removing the occurrence of VCA allophone in the camera stop mode, moving a lens to a VCA allophone removal location based on the generated control signal, and powering-off the camera module to move the lens moved to the VCA allophone removal location to a bottom surface of the lens.

In accordance with another aspect of the present invention, a lens movement control apparatus of a camera module is provided. The lens movement control apparatus includes a mode switch for switching the camera module from a camera operation mode to a camera stop mode, a VCA allophone removal controller for generating a control signal for removing the occurrence of a VCA allophone, a lens driving unit for moving a lens to a VCA allophone removal location under control of the VCA allophone removal controller, and a camera power controller for controlling a power off of the camera module to move the lens moved to the VCA allophone removal location to a bottom surface of the lens.

Since exemplary embodiment of the present invention forcibly move a lens of a camera module to an allophone removal location of a VCA and then power-off the camera module, it may prevent the occurrence of a VCA allophone. Furthermore, due to the simplicity of the operation algorithm, errors are reduced and the time from when a camera enters a stop mode to when the lens moves to the bottom surface may also be reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
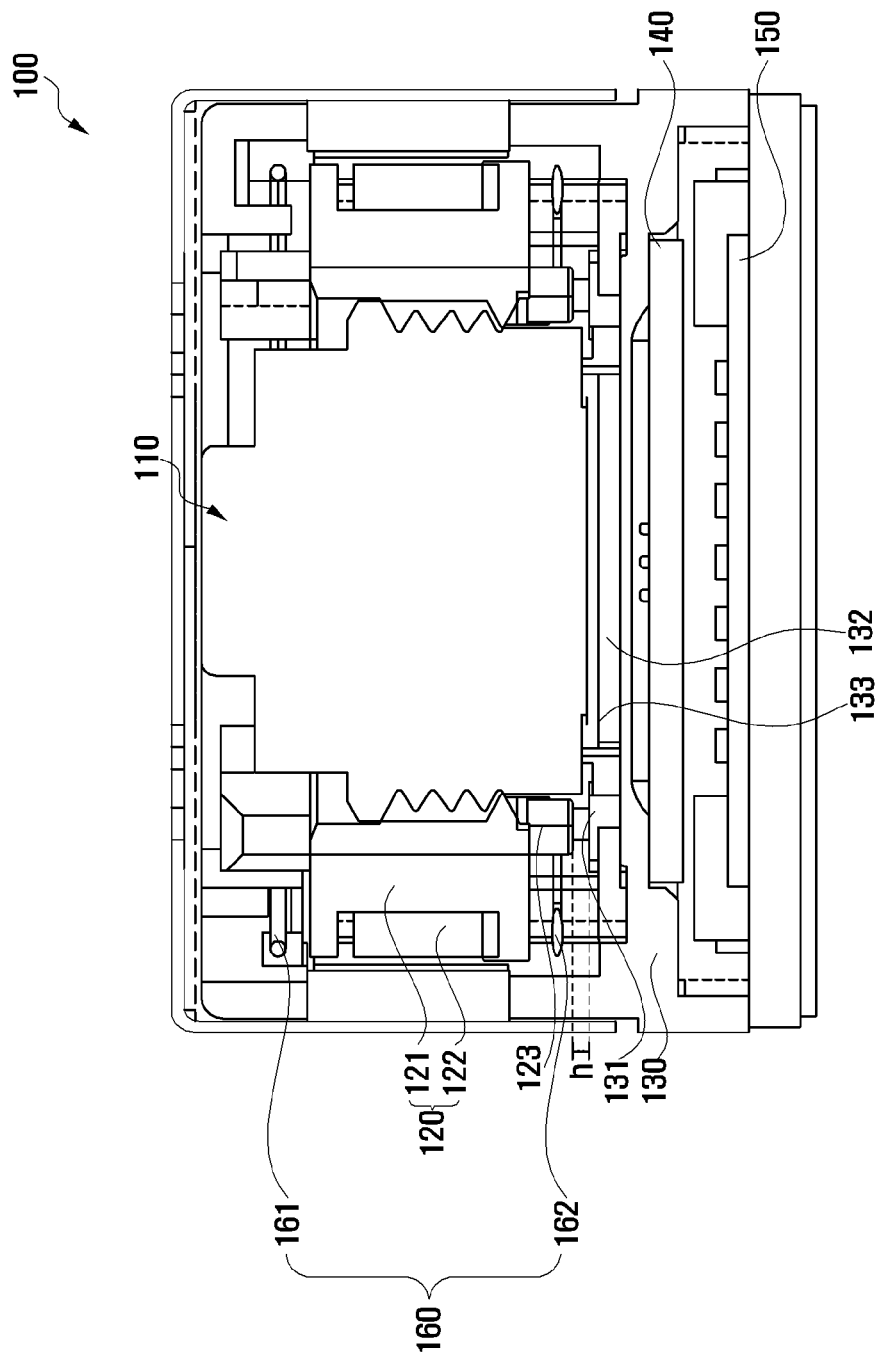
FIG. 1 is a cross-sectional view illustrating a state of a Voice Coil Actuator (VCA) in a camera module when it is in an operation mode according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a lens movement control method of a camera module having a short operation time capable of preventing the occurrence of an error and a Voice Coil Actuator (VCA) allophone, and an apparatus thereof.

FIGS. 1 through 3 and 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

The constituent elements of the camera module according to an exemplary embodiment of the present invention are similar to the constituent elements of the camera module described above with respect to FIGS. 1 through 3. Thus, FIGS. 1 through 3 will be referred to herein for convenience in description when describing exemplary embodiments of the present invention. However, it is to be understood that the present invention is applicable to devices other than those illustrated in FIGS. 1 through 3.

Figure 2:
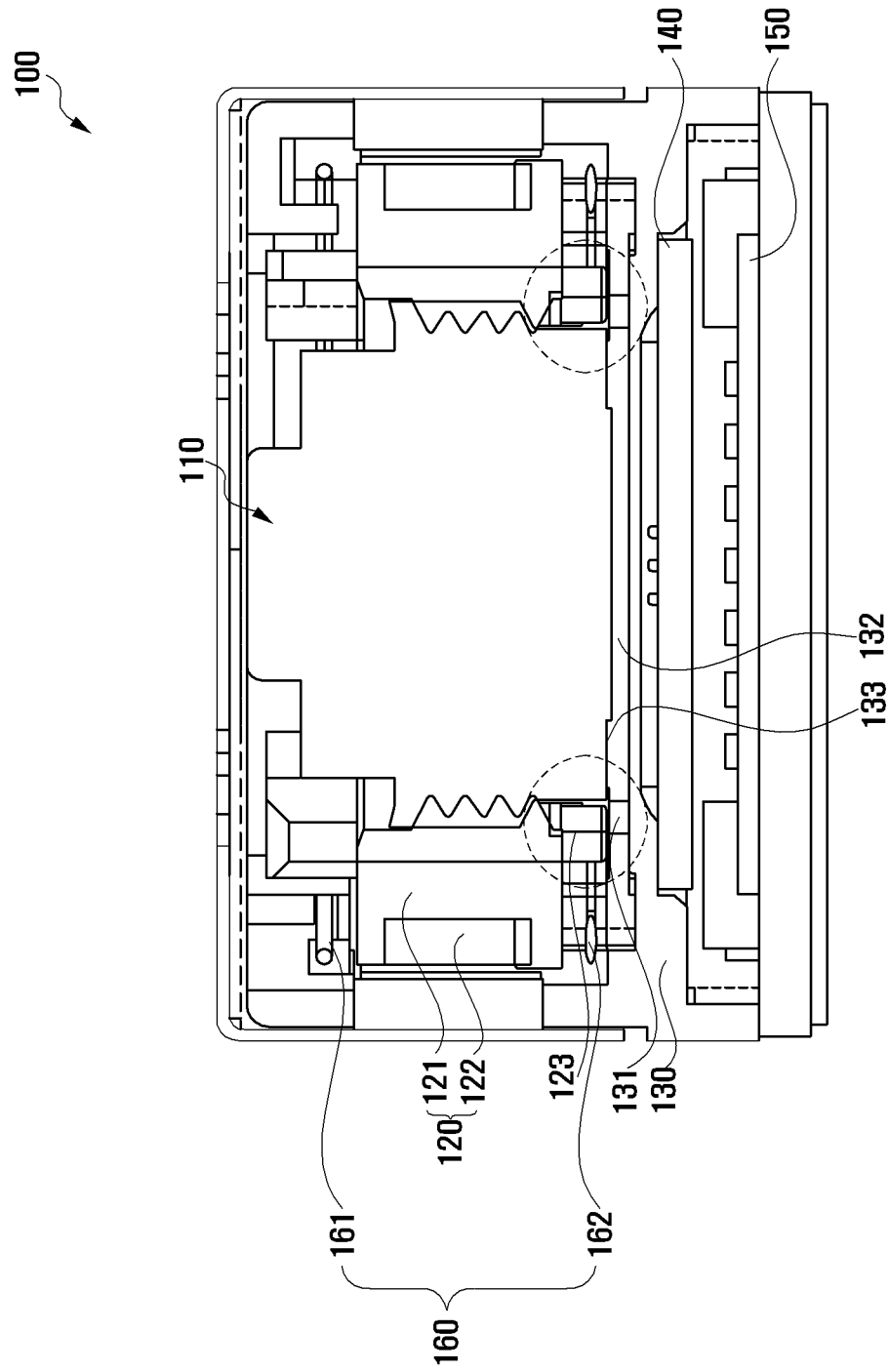
FIG. 2 is a cross-sectional view illustrating a state of a VCA in a camera module after a lens moves to a bottom surface according to the related art.
Figure 3:
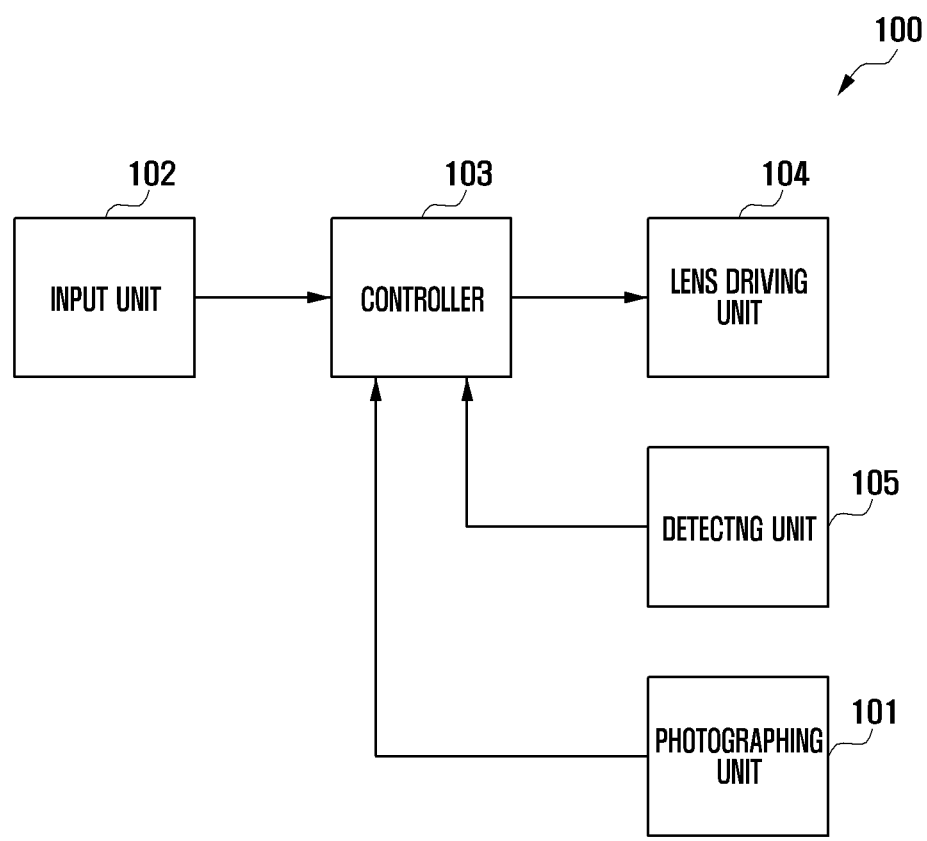
FIG. 3 is a block diagram illustrating a camera module with a VCA according to the related art.
Figure 4:
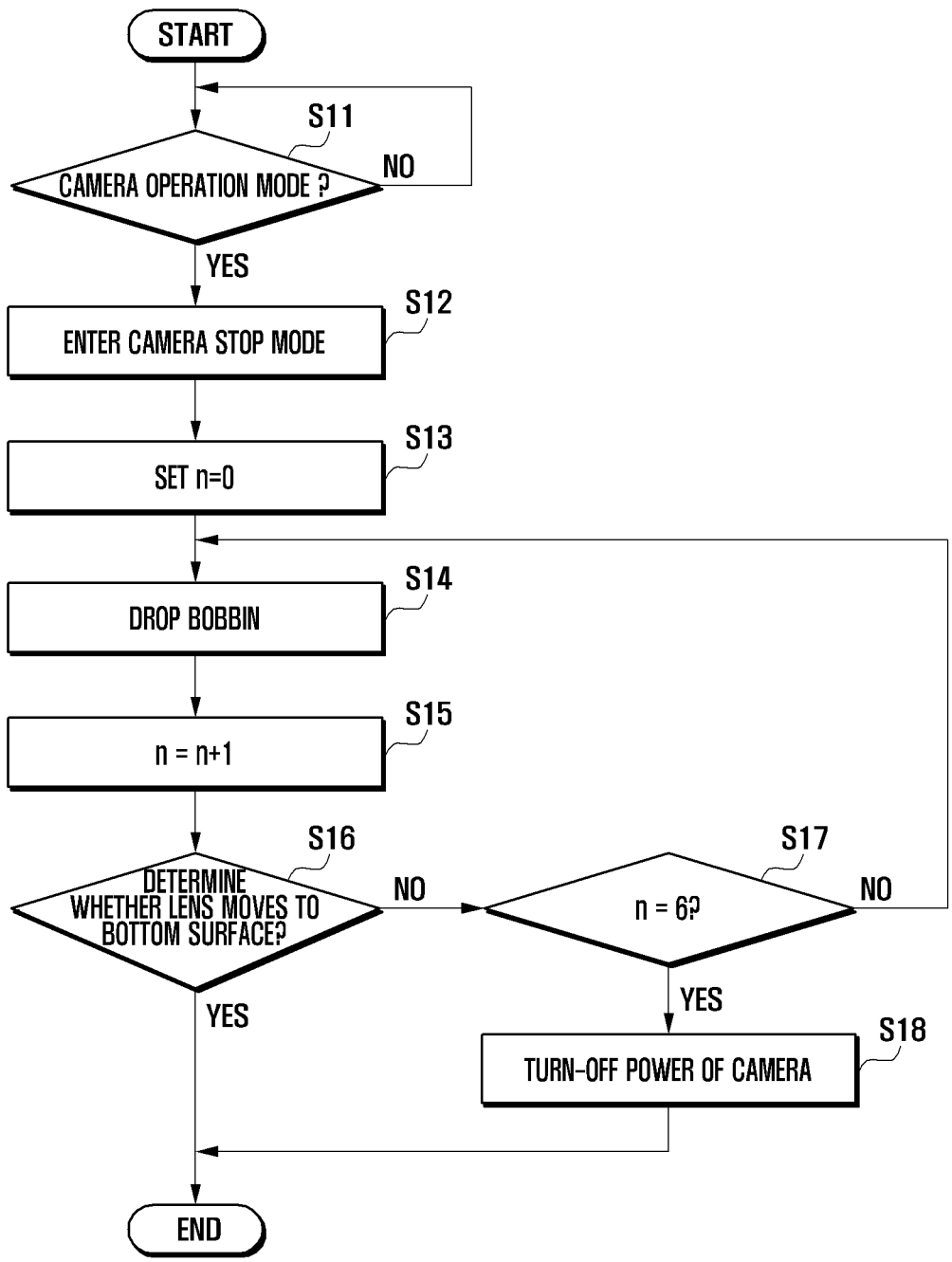
FIG. 4 is a flowchart illustrating a lens movement control method of a camera module for preventing an occurrence of a VCA allophone according to the related art.

Referring to FIGS. 1 through 3, a camera module is illustrated to which an exemplary lens movement control method of a camera module is applied. The camera module 100 includes a photographing unit 101, an input unit 102, a controller 103, a lens driving unit 104, and a detecting unit 105.

The photographing unit 101 includes a lens 110, an Infra-Red (IR) cut-off filter 140, and an image sensor 150. The lens 110 collects incident light to form an image on the image sensor 150. The IR filter 140 is provided at a lower portion of the lens 110, and the image sensor 150 is provided at a lower portion of the IR filter 140.

Although not shown in FIG. 3, the input unit 102 allows a user to input desired information in the camera module 100, and may be configured by a touch screen, a touch key, a button key, and the like.

The lens driving unit 104 includes a VCA 120, a lens driving power supply (not shown), a spring 160, and a housing 130. The VCA 120 makes the lens 110 perform a linear motion for focusing along an optical axis. The VCA 120 includes a bobbin 121 and a permanent magnet 122. The bobbin 121 engages with a side of the lens 110, in which a coil is wound around the bobbin 121. The bobbin 121 adjusts a location of the lens 110 according to an amount of electric current flowing through the coil. The permanent magnet 122 is provided at an outer side of the bobbin 121. When the camera module 100 performs a photographing operation, a lower end 123 of the bobbin 121 is spaced apart from a bobbin support 131 of the housing 130 by a predefined distance (h). The distance (h) between the lower end 123 of the bobbin 121 and the bobbin support 131 of the housing 130 is the same as that of a lower surface of the lens 110 and a bottom surface 133. The lens driving power supply functions to supply an electric current to the VCA 120 to drive the lens 110.

When camera power is turned-off, the spring 160 moves the lens 110 to the bottom surface 133. The spring 160 includes an upper spring 161 provided at an upper portion of the VCA 120 and a lower spring 162 provided at a lower portion of the VCA 120. The housing 130 surrounds, protects, and supports internal structural elements of the camera module 100. The housing 130 includes the bobbin support 131 and a lens lower end support 132. When camera power is turned-off, an upper surface of the lens lower end support 132 forms the bottom surface 133 contacting with the lens 110.

Although not shown in FIG. 3, the detecting unit 105 detects a location of the lens 110.

Although not shown in FIG. 3, the controller 103 receives respective signals from the input unit 102, the photographing unit 101, and the detecting unit 105 to control the lens driving unit 104. The controller 103 may include a mode switch for switching the camera module 100 from a camera operation mode to a camera stop mode, a VCA allophone removal controller for generating a control signal for removing the occurrence of a VCA allophone, and a camera power controller for controlling power on/off of a camera.

Figure 5:
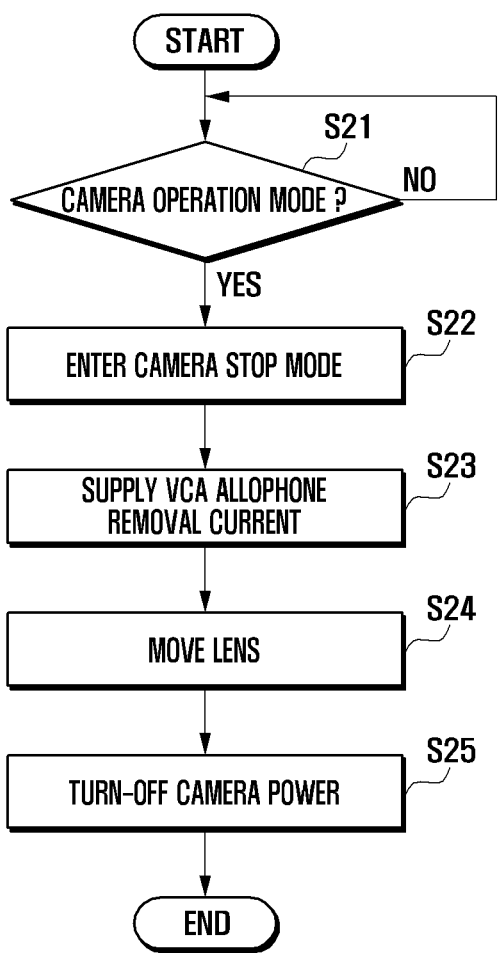
FIG. 5 is a flowchart illustrating a lens movement control method of a camera module according to an exemplary embodiment of the present invention.

FIG. 5 is a flowchart illustrating a lens movement control method of a camera module according to an exemplary embodiment of the present invention.

Referring to FIG. 5, a controller 103 determines whether a camera module is in a camera operation mode based on input from an input unit 102 in step S21. If it is determined in step S21 that the camera module is not in the camera operation mode, the process returns to step S21. In contrast, if it is determined in step S21 that the camera module is in the camera operation mode, the controller 103 enters a camera stop mode in step S22 to switch from the camera operation mode to the camera stop mode.

Next, after the controller 103 generates a lens movement command for moving the lens 110 to a VCA allophone removal location, a lens driving power supply supplies a VCA allophone removal current to a VCA 120 of a lens driving unit 104 in step S23. Subsequently, the VCA 120 moves the lens 110 to the VCA allophone removal location in step S24.

The VCA allophone removal location is a location of the lens 110 in the vicinity of the bottom surface 133 in which a VCA allophone may be prevented even when camera power is turned-off. The VCA allophone removal current is an electric current supplied to a VCA 120 that has a current amount capable of moving the lens 110 to the VCA allophone removal location. The lens movement command takes precedence over a camera power off command of an Application Programming Interface (API) stored in a memory (not shown) of the controller 103. For example, it is assumed that a maximum distance between the lens 110 and the bottom surface 133 is (hmax), an electric current supplied to the VCA 120 is 10 mA such that a distance between the lens 110 and the bottom surface 133 has a maximum value, and the VCA allophone removal location is a location such that a distance between the lens 110 and the bottom surface 133 is less than or equal to 0.1hmax. In this case, an electric current of 1 mA may be supplied to the VCA 120 to move the lens to the VCA allophone removal location.

Next, as shown in FIG. 5, the controller 103 turns-off camera power to move the lens 110 to the bottom surface 133 in step S25.

In this exemplary embodiment of the present invention, camera power is turned-off after the lens is moved to a VCA allophone removal location. Accordingly, although the lens is pressed by force of a spring due to powering-off of the camera module, a VCA allophone and an allophone between a lens and a lens lower end support may be prevented. Since a simple operation algorithm controls lens movement without determining presence of lens movement completion, the time from when a camera stop mode is entered to when the lens is moved to the bottom surface may be reduced in comparison with the related art, and also prevent an adverse effect.

While the invention has been shown and described with reference to certain exemplary embodiments thereof, it will be understood by those skilled in the art that various changes in form and details may be made therein without departing from the spirit of the invention as defined by the appended claims and their equivalents.

What is claimed is:

1. A lens movement control method of a camera module, the method comprising:
   switching the camera module from a camera operation mode to a camera stop mode;
   generating a control signal for removing the occurrence of Voice Coil Actuator (VCA) allophone in the camera stop mode;
   moving a lens to a VCA allophone removal location based on the generated control signal; and
   powering-off the camera module to move the lens moved to the VCA allophone removal location to a bottom surface of the lens.

2. The method of claim 1, wherein the moving of the lens comprises supplying a VCA allophone removal electric current having a current amount capable of moving the lens to the VCA allophone removal location.

3. The method of claim 1, wherein the generating of the control signal is performed by a lens movement command in which the VCA allophone is prevented even when the power of the camera module is turned-off.

4. The method of claim 1, wherein the switching of the camera module comprises determining whether the camera module is in the camera operation mode before entering the camera stop mode.

5. A lens movement control apparatus of a camera module, the apparatus comprising:
   a mode switch for switching the camera module from a camera operation mode to a camera stop mode;
   a Voice Coil Actuator (VCA) allophone removal controller for generating a control signal for removing the occurrence of a VCA allophone;
   a lens driving unit for moving a lens to a VCA allophone removal location under control of the VCA allophone removal controller; and
   a camera power controller for controlling a power off of the camera module to move the lens moved to the VCA allophone removal location to a bottom surface of the lens.

6. The lens movement control apparatus of claim 5, wherein the lens driving unit comprises an allophone removal electric current supply unit for supplying a VCA allophone removal electric current having a current amount capable of moving the lens to the VCA allophone removal location.

7. The lens movement control apparatus of claim 6, wherein the VCA allophone removal controller operates according to a lens movement command in which the VCA allophone is prevented even when the power of the camera module is turned-off.

8. The lens movement control apparatus of claim 5, wherein the mode switch comprises a controller for determining whether the camera module is in the camera operation mode before entering the camera stop mode.

* * * * *